United States Patent
Akagi et al.

(10) Patent No.: US 7,348,537 B2
(45) Date of Patent: Mar. 25, 2008

(54) MULTI-OPTICAL AXIS PHOTOELECTRIC SENSOR SYSTEM

(75) Inventors: Tetsuya Akagi, Fukuchiyama (JP);
Satoru Shimokawa, Ohtsu (JP);
Takayoshi Takahara, Kameoka (JP);
Kazunori Osako, Fukuchiyama (JP);
Fumihiko Misumi, Ibaraki (JP)

(73) Assignee: Omron Corporation, Kyoto-Shi (JP)

( * ) Notice: Subject to any disclaimer, the term of this patent is extended or adjusted under 35 U.S.C. 154(b) by 184 days.

(21) Appl. No.: 11/235,544

(22) Filed: Sep. 27, 2005

(65) Prior Publication Data

US 2006/0068643 A1    Mar. 30, 2006

(30) Foreign Application Priority Data

Sep. 29, 2004 (JP) .............................. 2004-283746

(51) Int. Cl.
*G06M 7/00* (2006.01)
*H01J 40/14* (2006.01)
*G08B 12/18* (2006.01)
*G06F 15/16* (2006.01)

(52) U.S. Cl. ..................... 250/221; 340/556; 709/209

(58) Field of Classification Search ................ 250/221; 340/556; 709/209
See application file for complete search history.

(56) References Cited

U.S. PATENT DOCUMENTS 5,015,840 A * 5/1991 Blau ........................... 250/221
6,137,408 A * 10/2000 Okada ......................... 340/556
6,256,881 B1 * 7/2001 Starkey ....................... 29/858
6,411,856 B1 * 6/2002 Takeuchi et al. ............. 700/3
6,635,862 B2 * 10/2003 Shteynberg et al. ......... 250/221
2007/0069114 A1 * 3/2007 Clifton et al. ............... 250/221

* cited by examiner

*Primary Examiner*—Thanh X. Luu
*Assistant Examiner*—Seung C Sohn
(74) *Attorney, Agent, or Firm*—Foley & Lardner LLP

(57) ABSTRACT

To provide a multi-optical axis photoelectric sensor and a multi-optical axis photoelectric sensor system, which enable function setting by an extremely simple operation, and further make it unnecessary to increase the size of a housing or to separately prepare a PC or a function setting tool. The multi-optical axis photoelectric sensor has: a columnar housing, from one end of which in the longitudinal direction an electric cord is pulled out, and at the other end of which in the longitudinal direction a plug-in type socket is provided, and a plug piece detachably attachable to the socket of the columnar housing. Particular information to serve as a function determining element on the columnar housing side is incorporated in the plug piece in a manner referenceable from a processing circuit on the columnar housing side via the socket. Further, the processing circuit on the columnar housing side is set so as to determine a function based upon particular information in the plug piece referenced via the socket.

8 Claims, 11 Drawing Sheets

Fig. 4

| Short-circuited connection terminal number | Function state |
|---|---|
| PN1→PN2 | Select Function A (e.g. Muting function) |
| PN1→PN3 | Select Function B (e.g. Blanking function bank 1) |
| PN1→PN4 | Select Function C (e.g. Blanking function bank 2) |
| PN1→PN2 and PN3 | Select Function D (e.g. Blanking function bank 3) |
| Open all | Stop operation |

MULTI-OPTICAL AXIS PHOTOELECTRIC SENSOR SYSTEM

BACKGROUND OF THE INVENTION

1. Field of the Invention

The present invention relates to a multi-optical axis photoelectric sensor system where one or more than one multi-optical axis photoelectric sensors for coupling are made connectable to one multi-optical axis photoelectric sensor for master, to improve extensibility of the system. Particularly, the present invention relates to a multi-optical axis photoelectric sensor system which facilitates a function setting operation in a multi-optical axis photoelectric sensor for master while using an existing mechanical constitution as it is.

2. Description of the Related Art

There are multi-optical axis photoelectric sensors having a large number of functions including a blanking function and a muting function. A common method in use of those functions is connecting a personal computer (PC) or a special function setting tool to a communication wire for selecting a function on a setting screen, so as to make a desired function efficient (cf. Japanese Patent Laid-Open No. 2002-289073). Further, as another method, building-in of a switching switch in the sensor housing is also known.

However, in the foregoing method of using the PC or function setting tool, since an operation is relatively complicated and thus requires a large number of process steps, it takes much time to complete setting while a setting error tends to occur. On the other hand, although there is another method of having the switching switch built-in in the sensor housing, when this method is used for the safety purpose, the housing needs to have a constitution where setting cannot be easily changed, for example by taking a measure of arranging an opening to be opened up with a special screw for allowing operation of a switch part, or reduplicating the switch. However, such measures undesirably result in self-increase in size of the housing.

SUMMARY OF THE INVENTION

The present invention was made by focusing attention on the foregoing problems with the multi-optical axis photoelectric sensor of the kind thus described. An object of the present invention is to provide a multi-optical axis photoelectric sensor and a multi-optical axis photoelectric sensor system which enable function setting by an extremely simple operation, and further make it unnecessary to increase the size of the housing or to separately prepare a PC or a function setting tool.

A multi-optical axis photoelectric sensor and a plug piece according to the present invention are a multi-optical axis photoelectric sensor and a plug piece to be used in combination with the multi-optical axis photoelectric sensor. The multi-optical axis photoelectric sensor has a pair of columnar housings. An electric cord is pulled out from one end of at least one of the columnar housings in the longitudinal direction, while a plug-in type socket is provided at the other end thereof in the longitudinal direction, and an end plug of an electric cord pulled out from the columnar housing of another multi-optical axis photoelectric sensor is detachably attachable to the socket of the columnar housing.

The columnar housing at least includes: a light projecting circuit for performing an operation of projecting light by means of light projecting element arrays as a series of light axis elements, or a light receiving circuit for performing an operation of receiving light by means of light receiving element arrays as a series of light axis elements, an input/output circuit (interface circuit) for performing an operation of inputting from or outputting to the outside, and a processing circuit for controlling over those circuits to realize a function as a multi-optical axis photoelectric sensor.

The plug piece is detachably attachable to the socket of the columnar housing, and particular information to serve as a function determining element on the columnar housing side is incorporated in the plug piece in a manner referenceable from the processing circuit on the columnar housing side via the socket.

Further, the processing circuit on the columnar housing side of the multi-optical axis photoelectric sensor is set so as to determine a function based upon particular information in the plug piece referenced via the socket.

According to such a constitution, when a plurality of kinds of plug pieces are prepared in line with a variety of functions on the columnar housing side, and particular information corresponding to each of required functions is incorporated in each of the plug pieces, it is possible only by selecting a plug piece corresponding to a desired function and attaching the plug piece to the socket, to make the function on the columnar housing side selectable and efficient. This remarkably facilitates a function setting operation and substantially reduces the setting time, as compared to the case of using a conventional PC or function setting tool, and also allows prevention of a wrong operation due to a setting error. Moreover, the socket in use here, which is to be attached to by the plug piece, is a socket originally prepared so as to be attached to by an end plug of an electric cord from a multi-optical axis photoelectric sensor for coupling, and hence almost no change is required in mechanical design on the columnar housing side, and simply the plug piece is added to the columnar housing. Accordingly, the constitution has an advantage of not increasing the size of the columnar housing, or some other advantages.

A mode where particular information is referenceable from the processing circuit on the columnar housing side via the socket may be formed by short-circuit between specific connection terminals connected to the socket in the plug piece in a manner corresponding to the classification of the particular information. According to such a constitution, it is possible to realize the mode at extremely low cost since the connection terminals in the plug piece are merely mutually short-circuited.

A mode where particular information is referenceable from the processing circuit on the columnar housing side via the socket may be formed by incorporating a memory, in which data corresponding to the particular information is stored, in the plug piece, while delivering a pass, linked to a port for reading the data, to a particular connection terminal connected to the socket. According to such a constitution, it is possible to broaden classification of data designating functions without restriction of the number of connection terminals in the plug piece.

A mode where particular information is referenceable from the processing circuit on the columnar housing side via the socket may be formed by incorporating a memory in which data corresponding to the particular information is stored, a CPU and a communication circuit in the plug piece, while delivering a pass, linked to the communication circuit, to a particular connection terminal connected to the socket. According to such a constitution, since data can be acquired from the memory only by means of the signal wire for serial communication, there are advantageously few restrictions by the number of connection terminals in the plug piece.

A function may be incorporated in the processing circuit in the columnar housing, which is a function of controlling or stopping the operation of the processing circuit when detecting failure of attachment of the plug piece to the socket at application of power. According to such a constitution, the plug piece for function setting on the columnar housing side as it is also functions as an unlock key at the time of activation of the sensor, and thus the sensor is not activated unless the plug piece is attached to the socket, which is suitable particularly for a multi-optical axis photoelectric sensor required to have high safety.

A function may be incorporated in the processing circuit in the columnar housing, which is a function of regularly monitoring whether the plug piece is attached to the socket or not, and controlling or stopping the operation of the processing circuit after detecting failure of attachment of the socket to the plug piece. According to such a constitution, in the case where the plug piece becomes detached from the socket for some reason after activation of the sensor, the operation of the processing circuit is immediately controlled or stopped, and thereby, the user would not feel anxious due to continuation of the operation of the sensor with the function setting thereof remaining unclear.

The plug pieces may be color-coded by function to be determined based upon the particular information. According to such a constitution, it becomes easier to intuitively understand the relation between a plug piece and a sensor function to be determined based upon the plug piece, thereby allowing certain prevention of wrong setting due to a plug piece selection error.

The particular information may be one to serve as an element for determining a blanking function or a muting function. According to such a constitution, these functions, which may pose a danger if wrongly set, can be certainly set.

The present invention viewed from another aspect can be also comprehended as a multi-optical axis photoelectric sensor system, comprising a multi-optical axis photoelectric sensor system for master and one or more than one multi-optical axis photoelectric sensors for coupling.

This multi-optical axis photoelectric sensor system comprises: a multi-optical axis photoelectric sensor for master, having a pair of columnar housings, from one end of at least one of which in the longitudinal direction an electric cord including an external input/output wire as a core wire is pulled out, and at the other end of at least one of which in the longitudinal direction a plug-in type socket is provided, one or more than one of multi-optical axis photoelectric sensors for coupling, having a pair of columnar housings, from one end of at least one of which in the longitudinal direction an electric cord including a signal wire between sensors as a core wire is pulled out, and at the other end of at least one of which in the longitudinal direction a plug-in type socket is provided, with a plug, detachably connectable to the socket of the multi-optical axis photoelectric sensor for master or another multi-optical axis photoelectric sensor, being attached to the end of the electric cord including the signal core wire between sensors, and a plug piece, detachably connectable to the socket of the multi-optical axis photoelectric sensor for master or the socket of the multi-optical axis photoelectric sensor for coupling.

The columnar housing of the multi-optical axis photoelectric sensor for master at least includes: a light projecting circuit for performing an operation of projecting light by means of light projecting element arrays as a series of light axis elements, or a light receiving circuit for performing an operation of receiving light by means of light receiving element arrays as a series of light axis elements, an input/output circuit (interface circuit) for performing an operation of inputting from or outputting to the outside, and a processing circuit for controlling over those circuits to realize a function as a multi-optical axis photoelectric sensor.

The columnar housing of the multi-optical axis photoelectric sensor for coupling at least includes: a light projecting circuit for performing an operation of projecting light by means of light projecting element arrays as a series of light axis elements, or a light receiving circuit for performing an operation of receiving light by means of light receiving element arrays as a series of light axis elements, an input/output circuit (interface circuit) for performing an operation of inputting from or outputting to the outside, and a processing circuit for controlling over those circuits to realize a function as a multi-optical axis photoelectric sensor.

Particular information to serve as a function determining element on the columnar housing side of the multi-optical axis photoelectric sensor for master or for coupling is incorporated in the plug piece in a manner referenceable from the processing circuit on the columnar housing side via the socket.

Further, a function is incorporated in the processing circuit in the columnar housing of the multi-optical axis photoelectric sensor for coupling, which is a function of transmitting particular information acquired from the plug piece attached via the socket or particular information from another adjacent multi-optical axis photoelectric sensor for coupling, to another multi-optical axis photoelectric sensor for coupling adjacent to the master side or the multi-optical axis photoelectric sensor for master. The processing circuit in the columnar housing of the multi-optical axis photoelectric sensor for master is set so as to determine a function based upon particular information in the plug piece referenced via the socket or particular information acquired from an adjacent multi-optical axis photoelectric sensor for coupling. Thereby, attachment of the plug piece to the socket of the columnar housing positioned at the most end of the series of mutually coupled columnar housings enables setting of a function of the multi-optical axis photoelectric sensor for master.

According to the multi-optical axis photoelectric sensor system as thus described, even in the case where one or more than one multi-optical axis photoelectric sensors for coupling are coupled to the multi-optical axis photoelectric sensor for master to extend the system, mere attachment of the plug piece to the socket of the columnar housing of the sensor located at the most end of the coupled sensors enables determination of an operational specification of the overall validation system.

According to the present invention, when a plurality of kinds of plug pieces are prepared in line with a variety of functions on the columnar housing side, and particular information corresponding to each of required functions is incorporated in each of the plug pieces, it is possible, only by selecting a plug piece corresponding to a desired function and attaching the plug piece to the socket, to make the function on the columnar housing side selectable and efficient. This remarkably facilitates a function setting operation and substantially reduces the setting time as compared to the case of using a conventional PC or function setting tool, and also allows prevention of a wrong operation due to a setting error. Moreover, the socket in use here, which is to be attached to by the plug piece, is a socket originally prepared so as to be attached to by an end plug of an electric cord from a multi-optical axis photoelectric sensor for coupling, and hence almost no mechanical design change is required but merely the plug piece is added on the columnar housing side. Accordingly, the constitution has an advantage of not having to increase the size of the columnar housing, or some other advantages.

BRIEF DESCRIPTION OF THE DRAWINGS

FIG. 4 shows a view in table form of the relation between a connection terminal to be short-circuited and a state of function.

DESCRIPTION OF THE PREFERRED EMBODIMENTS

Figure 1:
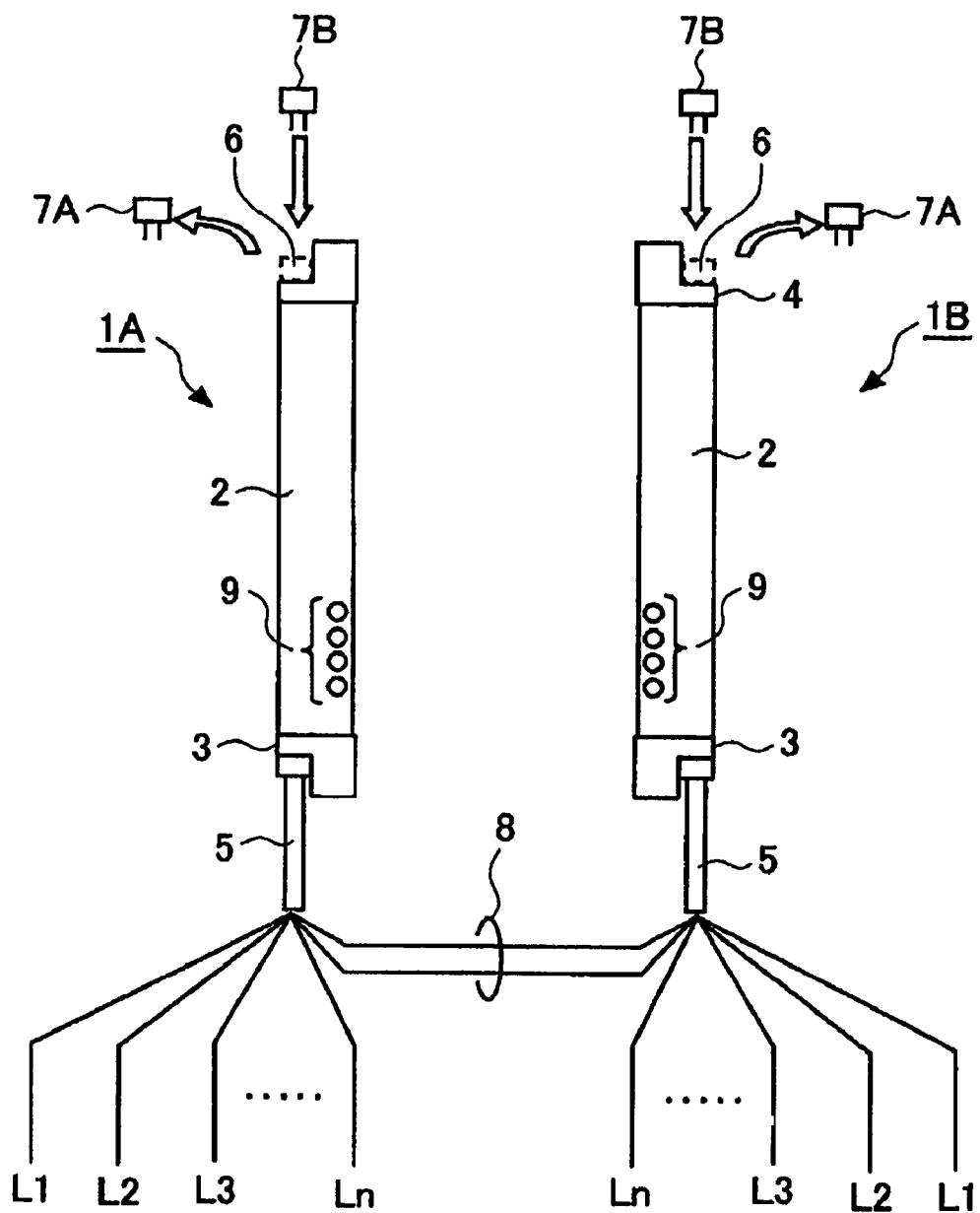
FIG. 1 shows a view of a state where multi-optical axis photoelectric sensors are oppositely disposed.

Below, one preferred embodiment of the present invention is described in detail by reference to attached drawings. FIG. 1 shows a view of a state where multi-optical axis photoelectric sensors, to which the present invention is applied, are oppositely disposed.

As shown in FIG. 1, in this example, a multi-optical axis photoelectric sensor 1A for master on the light projecting side and a multi-optical axis photoelectric sensor 1B for master on the light receiving side are oppositely disposed in an upright state. These first optical axis sensors 1A and 1B each have a columnar housing 2 with both ends thereof blocked. An electric cord 5 has been pulled out from a first end 3 of the columnar housing 2. The electric cord 5 includes "n" input/output wires L1, L2, L3, . . . Ln, and a communication wire 8 connecting between the optical axis sensors 1A and 1B. Meanwhile, a socket 6 is provided at a second end 4 of the columnar housing 2. As specifically described later, this socket 6 is originally connected to the multi-optical axis photoelectric sensor for coupling. A large number of connection terminals are provided in the socket 6. In this example, two kinds of plug pieces, composed of a first plug piece 7A and a second plug piece 7B, are alternatively attached to the socket 6. It is to be noted that in the figure, numeral 9 is given to a display light for displaying a variety of operational states.

Figure 2:
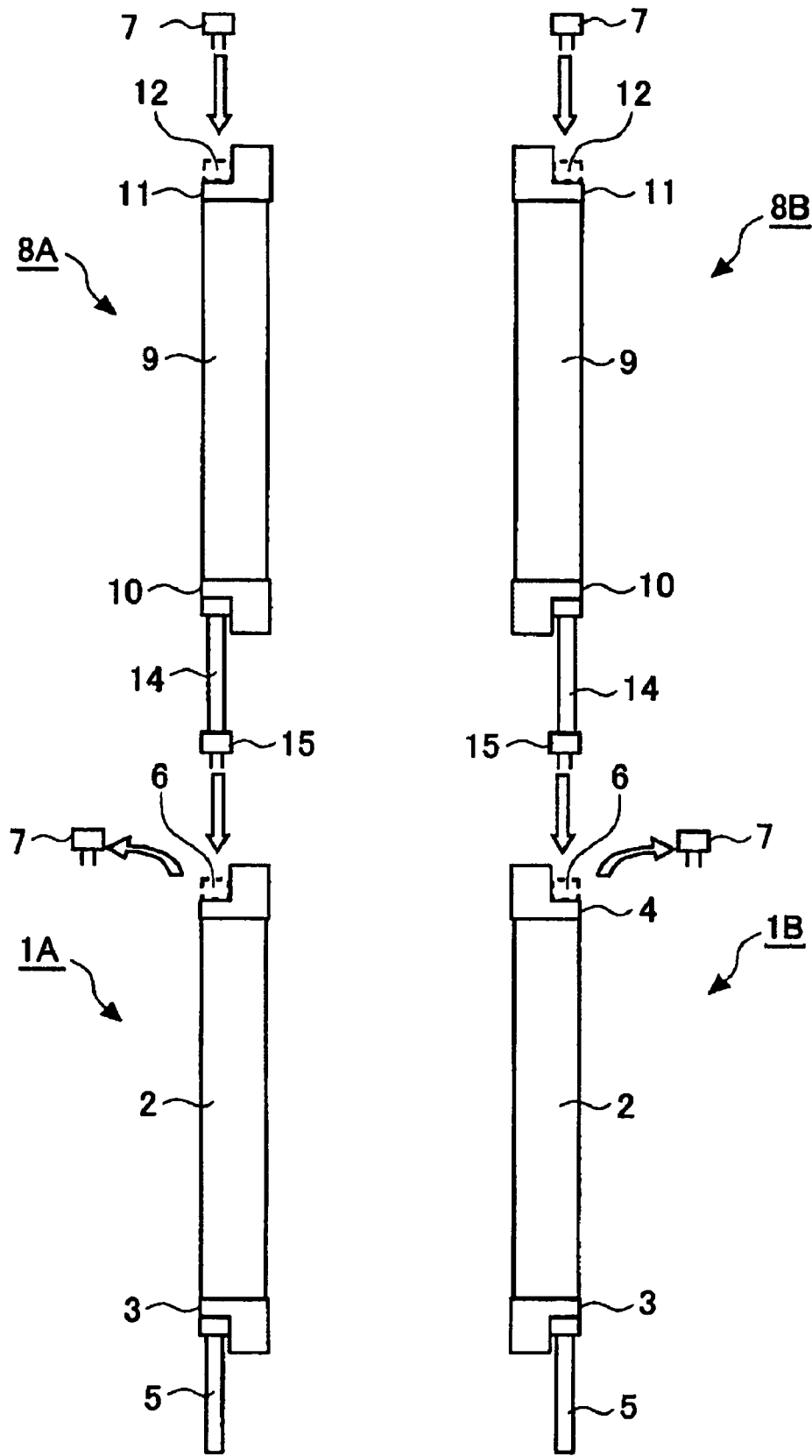
FIG. 2 shows a view of a state where the multi-optical axis photoelectric sensors are coupled.

FIG. 2 shows a view showing a state where the multi-optical axis photoelectric sensors are coupled. As shown in this figure, in this multi-optical axis photoelectric sensor system, one or more than one multi-optical axis photoelectric sensors (8A, 8B) for coupling are serially couplable to one multi-optical axis photoelectric sensor (1A, 1B) for master. It should be noted that in the figure, numeral 8A denotes a multi-optical axis photoelectric sensor for coupling on the light projecting side, while numeral 8B denotes multi-optical axis photoelectric sensor for master on the light receiving side.

A columnar housing 9 with both ends thereof blocked is also fixed to each of the multi-optical axis photoelectric sensors (BA, 8B) for coupling. An electric cord 14 has been pulled out from a first end 10 of the columnar housing 9, and a plug 15 is fixed to the end of the electric cord 14. This plug 15 is detachably attachable to the socket 6 on the side of the multi-optical axis photoelectric sensor (1A, 1B) for master. A socket 12 is provided at a second end 11 of the columnar housing 9. The configuration of the socket 12 is identical to that of the socket 6.

Namely, in this multi-optical axis photoelectric sensor system, the plug 15, which is fixed to the end of the electric cord 14 pulled out from the first end 10 of the multi-optical axis photoelectric sensor (8A, 8B) for coupling, is attached to the socket 6 provided at the second end 4 of the multi-optical axis photoelectric sensor (1A, 1B) for master so as to electrically connect the multi-optical axis photoelectric sensor (1A, 1B) for master with the multi-optical axis photoelectric sensor (8A, 8B) for coupling.

Moreover, to the socket 12 provided at the second end 11 of the multi-optical axis photoelectric sensor (8A, 8B) for coupling, the plug 15, which is fixed to the end of the electric cord 14 pulled out from the first end 10 of another multi-optical axis photoelectric sensor (8A, 8B) for coupling with a configuration identical to that of the above multi-optical axis photoelectric sensor (8A, 8B) for coupling, is detachably attachable. Therefore, it is possible to extend the multi-optical axis photoelectric sensor system by serially connecting a plurality of other multi-optical axis photoelectric sensors (8A, 8B) for coupling with the identical configuration, to the socket 12 provided at the second end 11 of the multi-optical axis photoelectric sensor (8A, 8B) for coupling.

Figure 3:
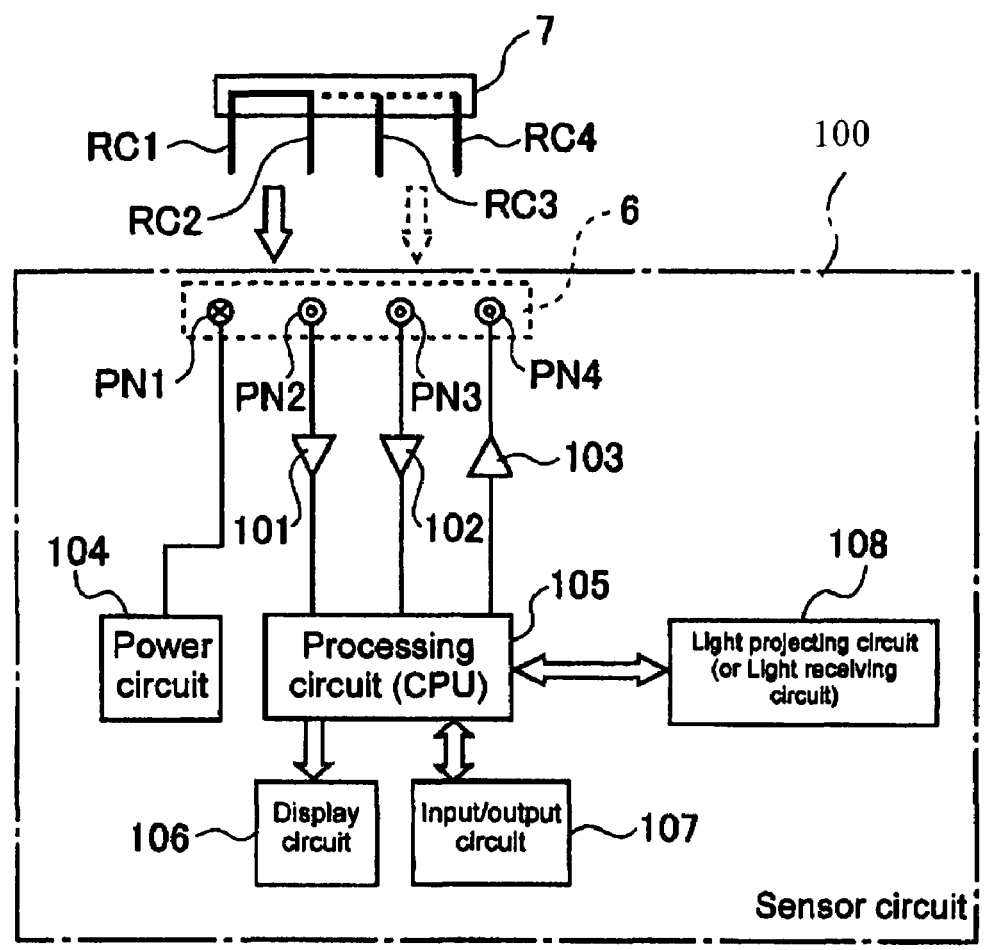
FIG. 3 shows a circuit diagram (No. 1) showing the relation between a plug piece and a sensor circuit.

A sensor circuit is built inside the housing 2 of the multi-optical axis photoelectric sensor (1A, 1B) for master. FIG. 3 shows a circuit diagram (No. 1) showing the relation between the plug piece 7 and a sensor circuit 100. As shown in the figure, the sensor circuit 100 includes: a light projecting circuit or light receiving circuit 108 for performing an operation of projecting or receiving light with respect to light projecting element arrays or light receiving element arrays (omitted in the figure) as a series of light axis elements, an input/output circuit (interface circuit) 107 for performing an operation of inputting from or outputting to an external PLC or the like, a display circuit 106 for performing an external display operation, a processing circuit (CPU) 105 for controlling over those circuits to realize a function as a multi-optical axis photoelectric sensor, and a power circuit 104.

The socket 6 is constituted to have, for example, 20 to 30 connection terminals (PN). In the example of FIG. 3, only four connection terminals PN1 to PN4, not used so far, are shown. A direct voltage is supplied from the power circuit 104 to the connection terminal PN1. The connection terminals PN2, PN3 and PN4 are connected to the processing circuit 105 via waveform shaping gates 101, 102 and 103, respectively.

Meanwhile, the plug piece 7 is also constituted to have, for example, 20 to 30 connection terminals (RC) corresponding to the socket 6. In the example of FIG. 3, only four connection terminals RC1 to RC4, not used so far, are shown. What is of importance here is that particular information to serve as a function determining element on the columnar housing side is incorporated in the plug piece 7 in a manner referenceable from the processing circuit 105 on the columnar housing side via the socket 6.

In the example of FIG. 3, as a mode where particular information is referenceable from the processing circuit 105 on the columnar housing side via the socket 6, a mode, formed by short-circuit between specific connection terminals connected to the socket in the plug piece 7 in a manner corresponding to the classification of the particular information, is employed. Namely, in the example of FIG. 3, only two adjacent connection terminals RC1 and RC2, among the four connection terminals RC1 to RC4 in the plug piece 7, are short-circuited, and the other connection terminals RC3 and RC4 are held in an open state where these connection terminals are not conducted to one another. When the plug piece 7 having such a constitution is attached to the socket 6, a direct voltage outputted from the power circuit 104 flows from the connection terminal PN 1 on the side of the socket 6 via the connection terminals RC1 and RC2 on the side of the plug piece 7, and then appears at the contact terminal PN2 on the side of the socket 6. Thereat, on the side of the processing circuit 105, an output from each of the waveform shaping gates 101, 102 and 103 becomes an HLL, whereby it is possible to detect that the connection terminals PN and PN2 have been short-circuited in the socket 6 by the plug piece 7.

FIG. 4 shows a view in table form of the relation between a number of a connection terminal to be short-circuited and a state of function. In this example, a function A (muting function) is selected by connecting PN1 with PN2. A function B (blanking function) is selected by short-circuiting PN1 and PN3. A function C (standard function) is selected by short-circuiting PN1 and PN4. Function D (coupling function) is selected by short-circuiting PN1, PN2 and PN3. A stopping operation is selected by opening all of PN2 to PN4.

It is to be noted that a sensor circuit is built inside the housing 9 also on the side of the multi-optical axis photoelectric sensor (8A, 8B) for coupling, although omitted in the figure. This sensor circuit at least includes: a light projecting circuit or light receiving circuit for performing an operation of projecting or receiving light with respect to light projecting element arrays or light receiving element arrays as a series of light axis elements, an input/output circuit (interface circuit) for performing an operation of inputting from or outputting to the outside, a display circuit for performing an external display operation, and a processing circuit for controlling over those circuits to realize a function as a multi-optical axis photoelectric sensor.

Further, as specifically described later, a function is incorporated in the processing circuit in the columnar housing of the multi-optical axis photoelectric sensor for coupling, which is a function of transmitting particular information, acquired from the plug piece attached to the socket or from another adjacent multi-optical axis photoelectric sensor for coupling, to another multi-optical axis photoelectric sensor for coupling adjacent to the master side or the multi-optical axis photoelectric sensor for master.

Figure 7:
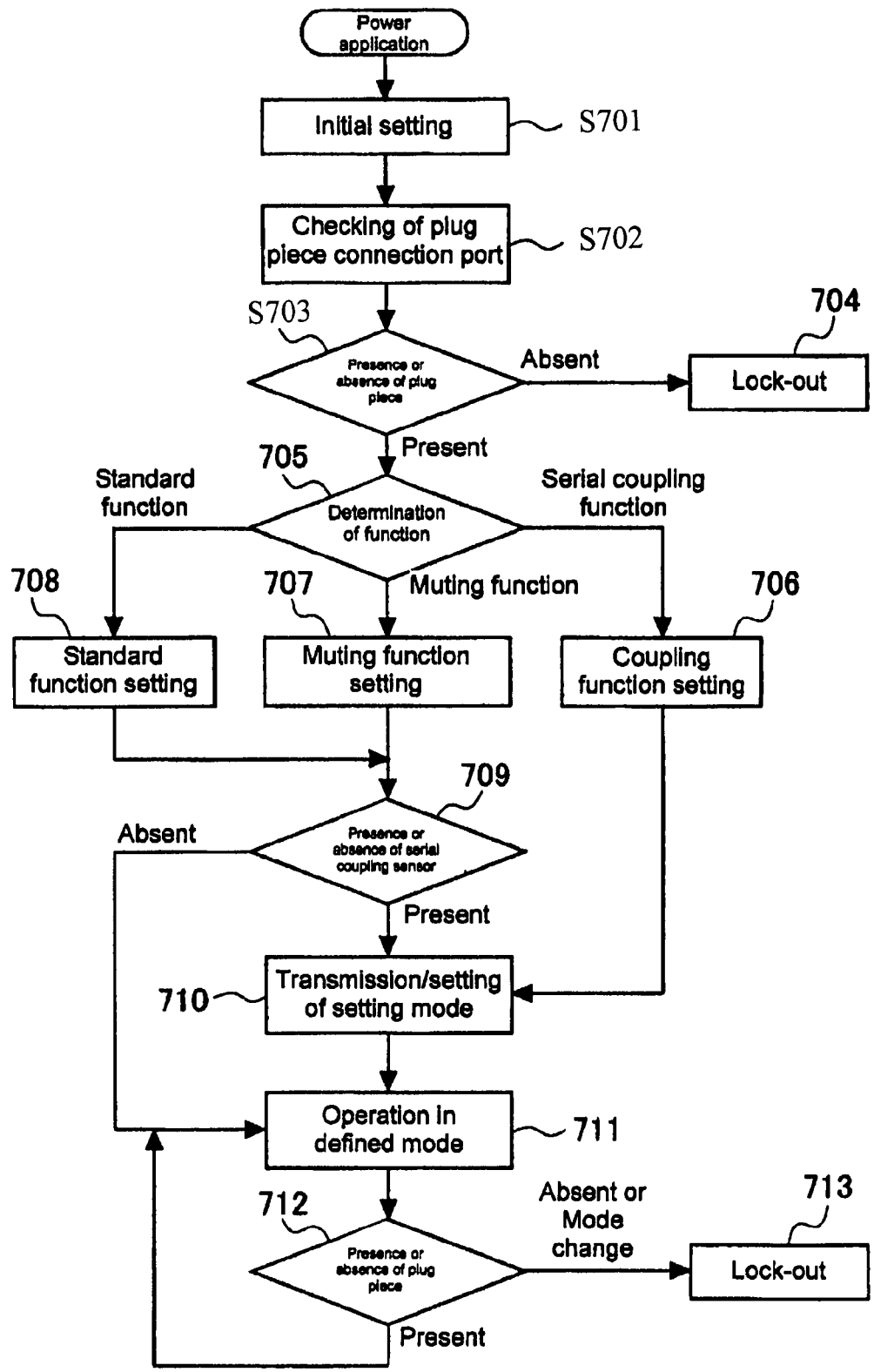
FIG. 7 shows a flowchart of processing of a CPU on the sensor circuit side.

Next, FIG. 7 shows a flowchart of processing of a CPU 105 on the sensor circuit side. In this figure, when the processing is started by application of power, an initial setting process (Step S701) is executed to initially set a variety of flags and registers. Thereafter, a checking process for a plug piece connection port (Step S702) is executed to check a short-circuit mode of the connection terminals RC1 to RC4 in the plug piece 7. Subsequently, based upon the checked state of the plug piece connection port (short-circuit mode), a determination process is started.

In the first place in this determination process, the presence or absence of the plug piece 7 is determined (Step S703). Here, when failure of attachment of the plug piece 7 to the socket 6 is determined (Step S703, absent), a lock-out process (Step 704) is executed to stop the operation of the photoelectron sensor from that time on. Namely, when the power is applied without application of the plug piece 7 to the socket 6 of the housing 2, a photoelectron sensor cannot be activated.

As opposed to this, when attachment of the plug piece 7 to the socket 6 is determined (Step S703, present), a determination process for a function selected by the plug piece 7 (Step 705) is then executed. In this function determination process (Step 705), when the function is determined as a short-circuited state corresponding to the "standard function", a standard function setting process (Step 708) is immediately executed so as to set the operational mode of the photoelectron sensor to an operational mode corresponding to the previously determined "standard function". Moreover, when the function is determined as a short-circuited state corresponding to the "muting function", a muting function setting process (Step 707) is immediately executed so as to set the operational mode of the photoelectron sensor to an operational mode corresponding to the "muting function". Further, when the function is determined as a state corresponding to the "serial coupling function", a coupling function setting process (Step 706) is immediately executed. It is to be noted that the determination of the serial coupling function in Step 705 is performed based upon a state of a connection terminal other than the connection terminals RC1 to RC4 shown in FIG. 3, which is a connection terminal for data transmission not shown in the figure.

Meanwhile, the presence or absence of a serial coupling sensor (Step 709) is determined after completion of execution of the standard function setting process (Step 708) and the muting function setting process (Step 707), and when connection of the serial coupling sensors is determined (Step 709, present), a setting mode transmission/setting process (Step 710) is executed. In the setting mode transmission/setting process (Step 710), by communication with serially coupled multi-optical axis photoelectric sensors (8A, 8B) for coupling, function setting information is acquired from another coupled photoelectron sensor. Based upon this acquired setting information, the standard function setting, the muting function setting or the like is executed in the foregoing manner. Namely, when the plug piece 7 is attached to the multi-optical axis photoelectric sensor (1A, 1B) for master, the standard function setting, the muting function setting or the like is executed based upon the information from the plug piece 7, whereas when the multi-optical axis photoelectric sensors (8A, 8B) for coupling are connected to the multi-optical axis photoelectric sensor (1A, 1B) for master, the standard function setting, the muting setting, the blanking setting or the like is executed based upon the information transmitted from the multi-optical axis photoelectric sensors (8A, 8B) for coupling.

Thereafter, while regularly checking whether the plug piece 7 is attached to the socket 6 or not (Step 712), an operation in the defined mode set in Step 710 is repeatedly executed (Step 711). During this time, if the plug piece 7 is detached from the socket 6 or exchanged with another plug piece 7 for some reason, the plug piece is detected as absent (Step 712, absent or mode change), whereby a lock-out process as in Step 704 is executed (Step 713) to stop the operation of the photoelectron sensor. Accordingly, if the plug piece 7 is detached from the socket 6 or another plug piece is attached during the operation, an operator becomes unable to check the operational mode from the outside, and in that case, the lock-out process (Step 713) is executed so as to stop the operation of the photoelectron sensor.

It should be noted that the plug pieces 7 are preferably colored with different colors according to functions respectively set to the plug pieces 7. According to such coloring by function, the color of the plug piece 7 attached to the columnar housing 2 leads to instinctive understanding of the setting mode of the photoelectron sensor. It is thereby possible to prevent an inadvertent operation based upon a setting error from occurring.

Figure 5:
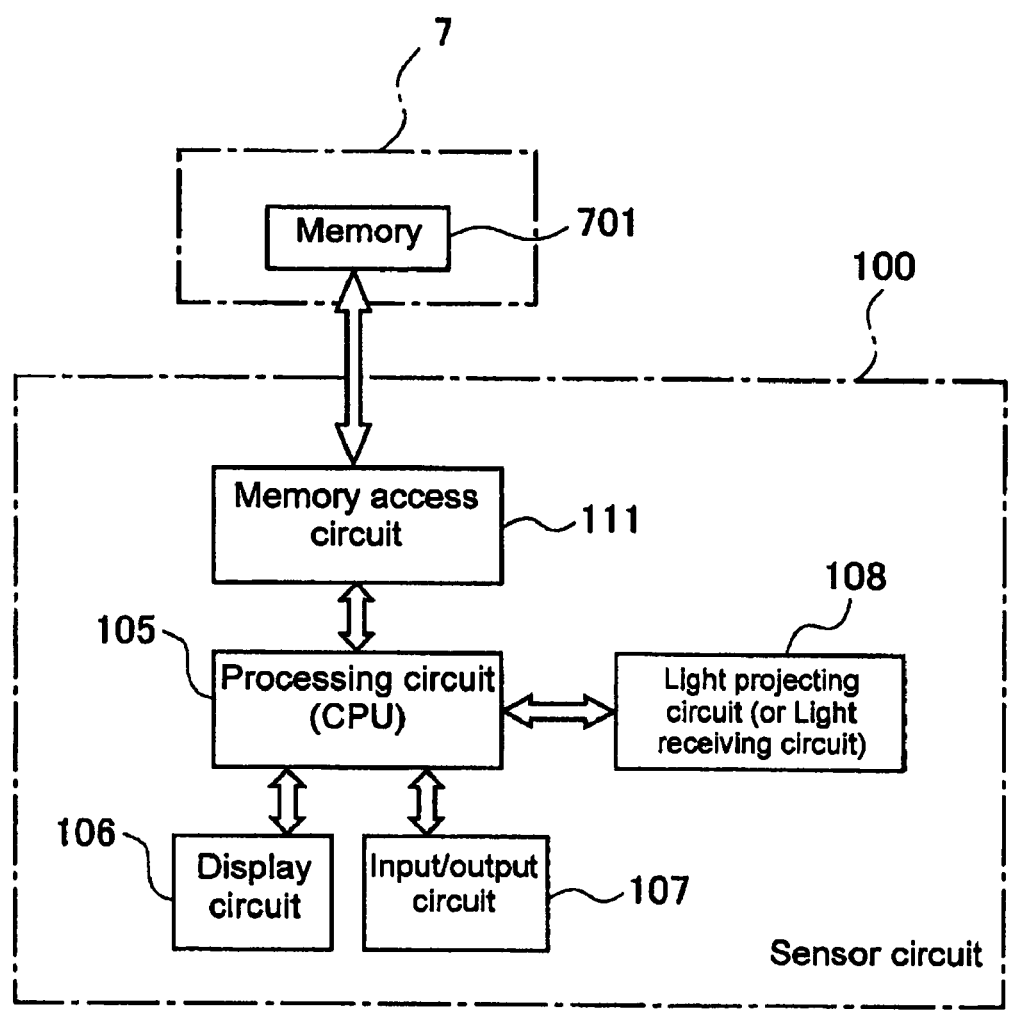
FIG. 5 shows a circuit diagram (No. 2) showing the relation between a plug piece and a sensor circuit.

FIG. 5 shows a circuit diagram (No. 2) showing the relation between a plug piece and a sensor circuit. In this example, a mode where particular information is referenceable from the processing circuit 105 on the side of the columnar housing 2 via the socket 6 is formed by incorporating a memory 701, in which data corresponding to the particular information is stored, in the plug piece 7, while delivering a pass, linked to a port for reading the data, to a particular connection terminal (RC) connected to the socket 6. It should be noted that in the figure, numeral 111 denotes a memory access circuit. According to such a constitution, it is possible to broaden classification of data designating functions without restriction of the number of connection terminals (RC) in the plug piece 7.

Figure 6:
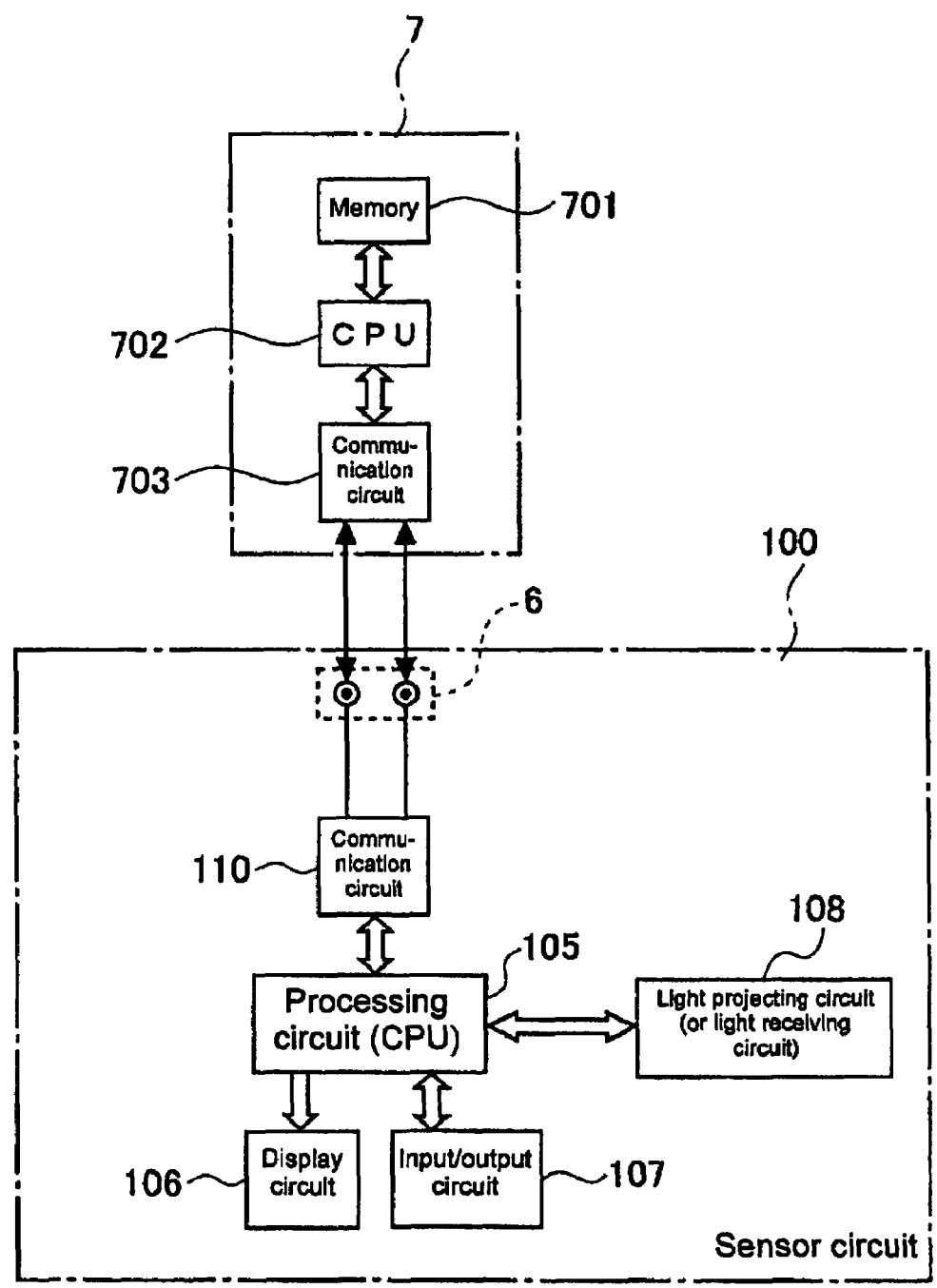
FIG. 6 shows a circuit diagram (No. 3) showing the relation between a plug piece and a sensor circuit.

Next, FIG. 6 shows a circuit diagram (No. 3) showing the relation between a plug piece and a sensor circuit. In this example, a mode where particular information is referenceable from the processing circuit 105 on the side of the columnar housing 2 via the socket 6 is formed by incorporating a memory 701 in which data corresponding to the particular information is stored, a CPU 702 and a communication circuit 703 in the plug piece 7, while delivering a pass, linked to the communication circuit 703, to a particular connection terminal (RC) connected to the socket 6. According to such a constitution, since data can be acquired from the memory 701 only by means of the signal wire for serial communication, there are advantageously few restrictions by the number of connection terminals (RC) in the plug piece 7.

Figure 8:
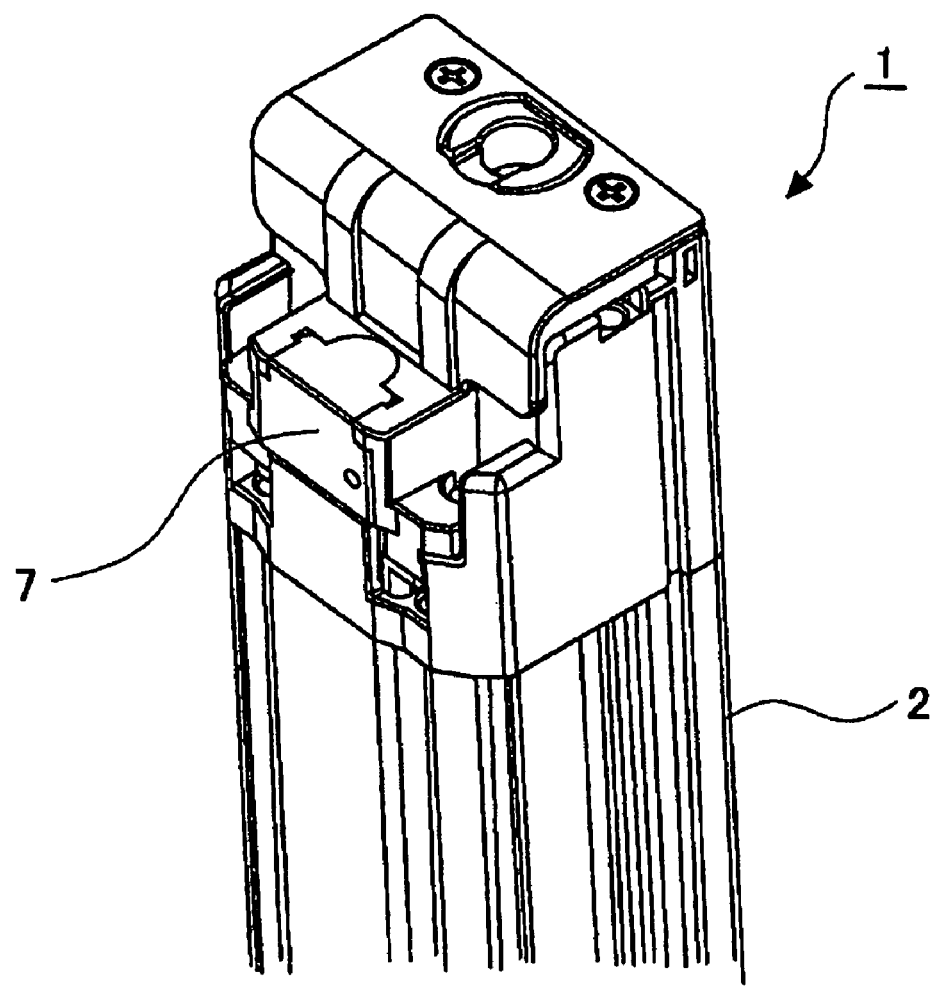
FIG. 8 shows an external view of a state where the plug piece has been attached.
Figure 9:
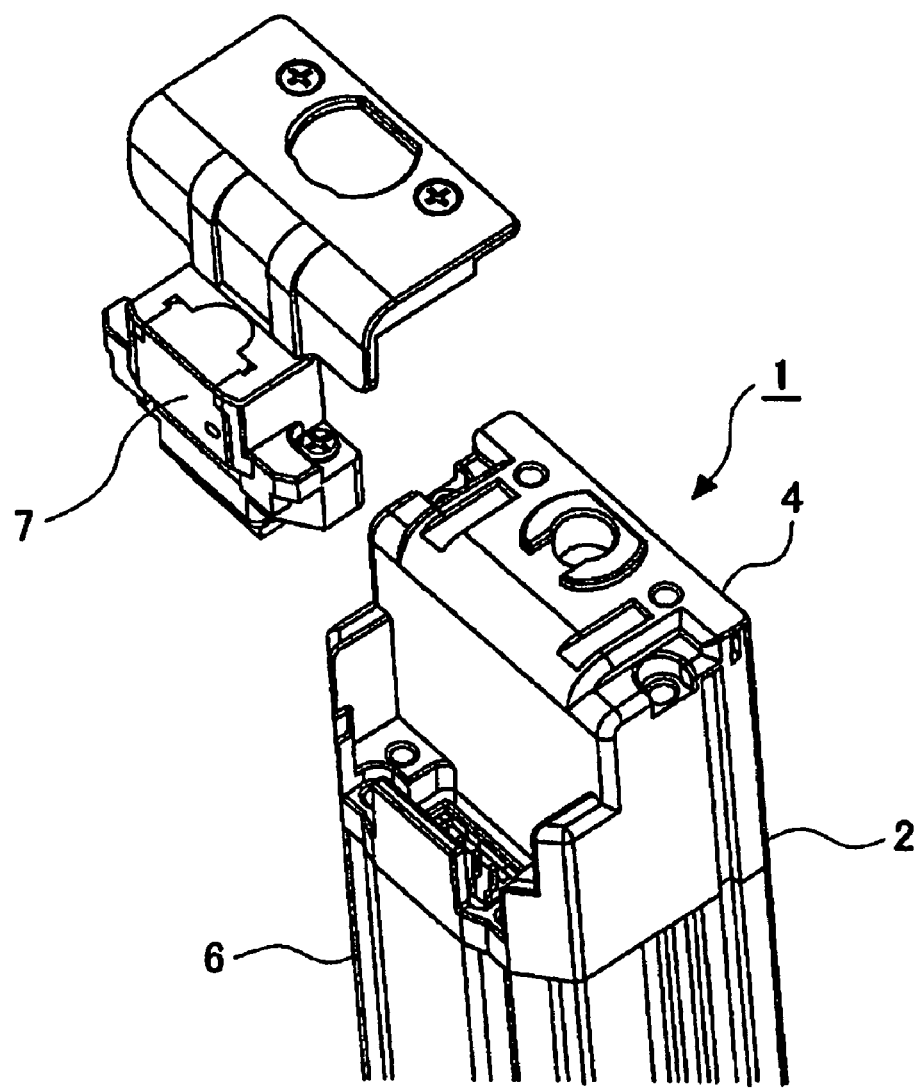
FIG. 9 shows an external view of a state where the plug piece has been detached.

Finally, a specific configuration of the plug piece 7 is described. A function required as the plug piece 7 is being attachable to the socket 6 that is so far in use. As for a specific external shape and the like of the plug piece 7, a variety of forms can be employed. However, since the plug piece 7 is to be attached to the end of the columnar form of the multi-optical axis photoelectric sensor, the form of the plug piece 7 naturally should not cause damage on the configuration or the external appearance of the end of the columnar housing. One example of the plug piece 7 designed from such a perspective is shown in FIGS. 8 and 9. As apparent from the figures, the plug piece 7 is detachably attachable to the socket 6, and further in the attached state, the plug piece 7 does not make the external appearance of the end of the housing 2 larger than necessary.

Figure 10:
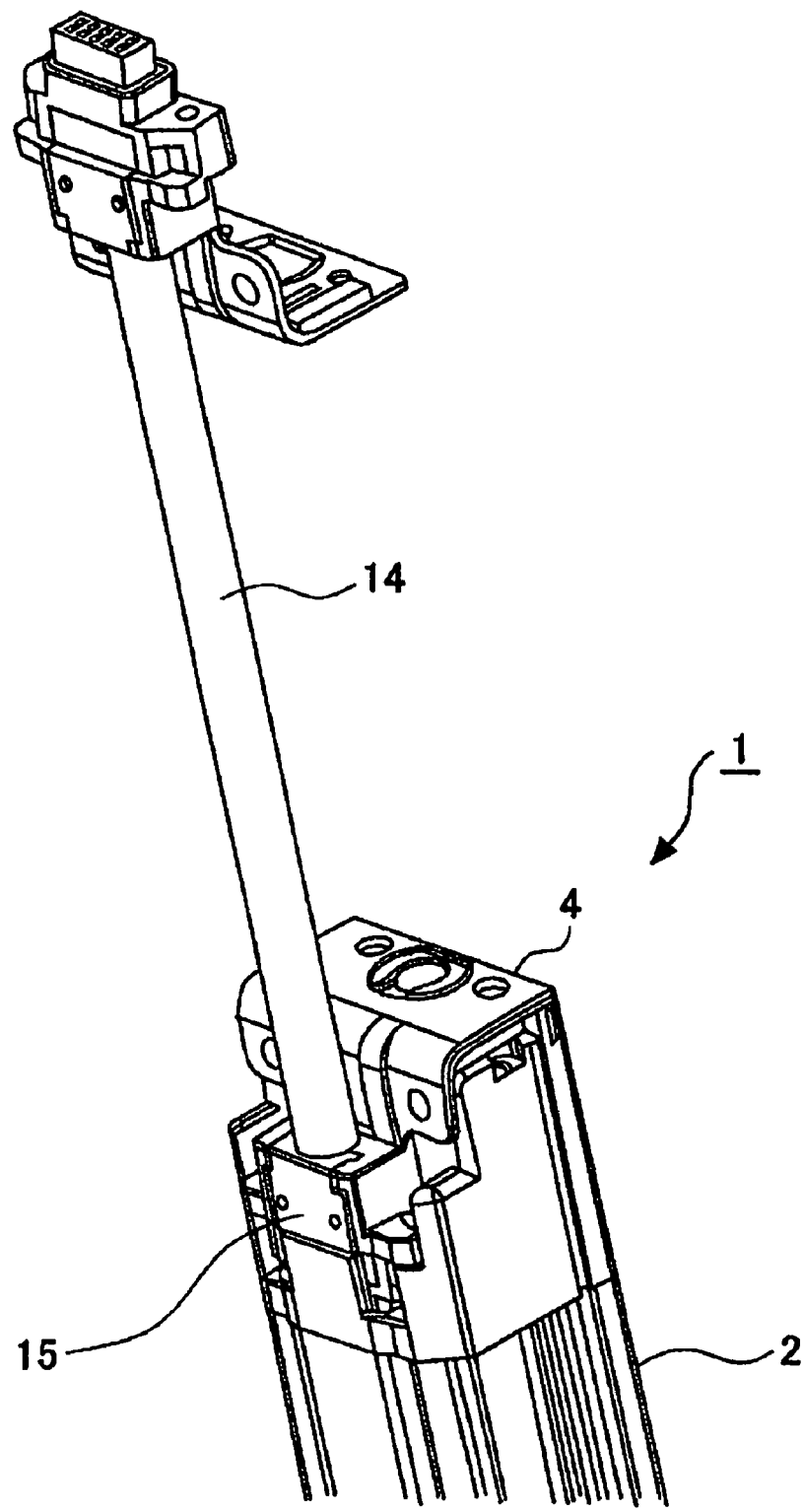
FIG. 10 shows an external view of a state where a serial coupling cord has been attached in place of the plug piece.
Figure 11:
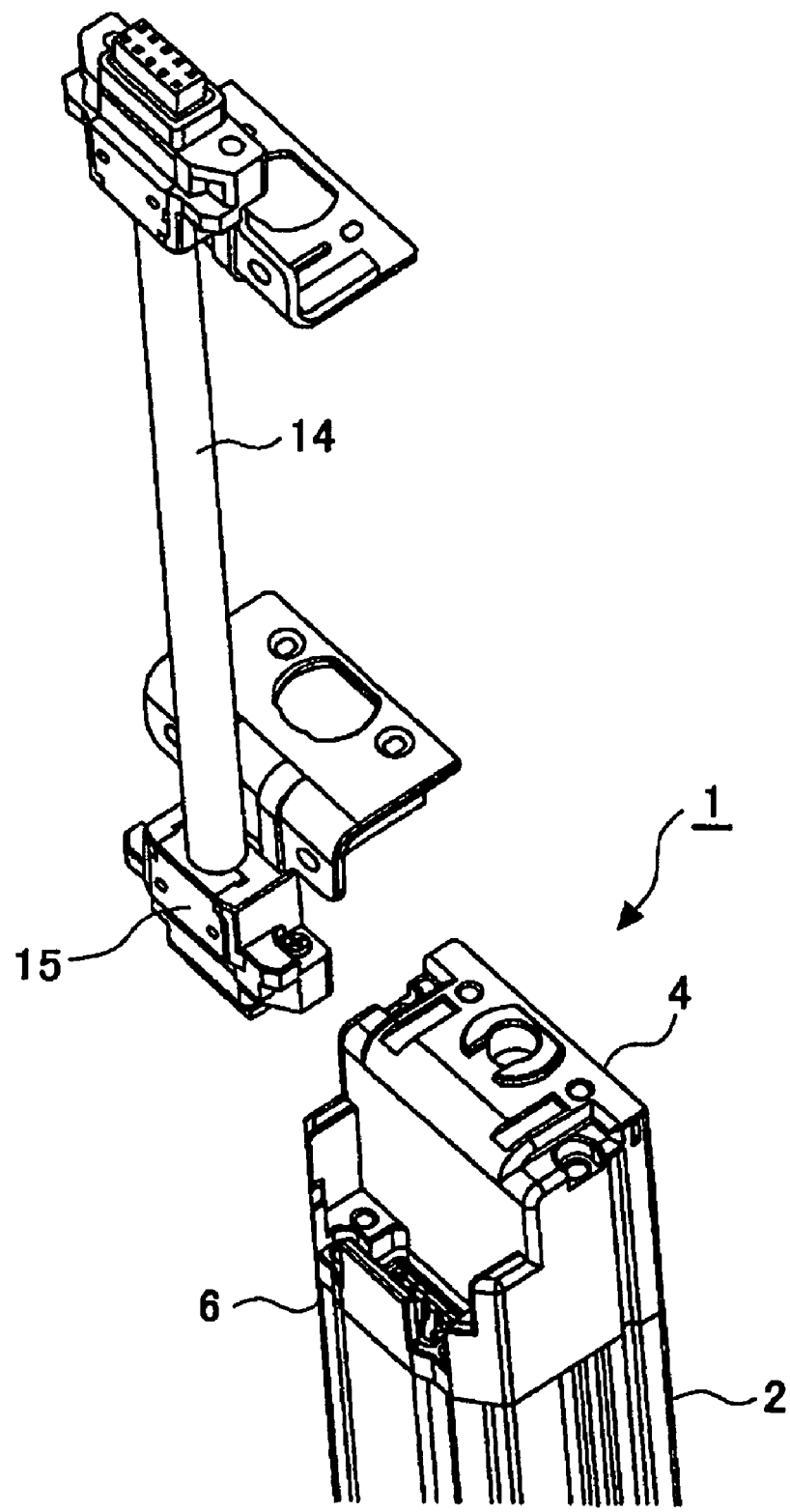
FIG. 11 shows an external view of a state where the serial coupling cord has been detached.

To the socket 6 shown in FIGS. 8 and 9, the electric cord 14 from the multi-optical axis photoelectric sensor for coupling is originally connected via the plug 15. An example of such original connection is shown in FIGS. 10 and 11. As apparent from those figures, the plug 15 fixed to the end of the electric cord 14 extending from the multi-optical axis photoelectric sensor for coupling is attached to the socket 6 provided at the end of the housing 2. As apparent by reference to FIGS. 8 to 11, it may be readily understood that the plug piece 7 in the present embodiment is prepared by using the conventional configuration of the multi-optical axis photoelectric sensor and attaching the plug piece 7 to the part of the socket 6.

According to the present invention, it is possible to provide a multi-optical axis photoelectric sensor and a multi-optical axis photoelectric sensor system, which enable function setting by an extremely simple operation, and further make it unnecessary to increase the size of a housing or to separately prepare a PC or a function setting tool.

What is claimed is:

1. A multi-optical axis photoelectric sensor and a plug piece to be used in combination with the multi-optical axis photoelectric sensor, wherein the multi-optical axis photoelectric sensor has a pair of columnar housings, an electric cord is pulled out from one end of at least one of the columnar housings in the longitudinal direction, while a plug-in type socket is provided at the other end thereof in the longitudinal direction, and an end plug of an electric cord pulled out from the columnar housing of another multi-optical axis photoelectric sensor is detachably attachable to the socket of the columnar housing, the columnar housing at least includes: a light projecting circuit for performing an operation of projecting light by means of light projecting element arrays as a series of light axis elements, or a light receiving circuit for performing an operation of receiving light by means of light receiving element arrays as a series of light axis elements, an input/output circuit for performing an operation of inputting from or outputting to the outside, and a processing circuit for controlling over those circuits to realize a function as a multi-optical axis photoelectric sensor, the plug piece is detachably attachable to the socket of the columnar housing, and particular information to serve as a function determining element on the columnar housing side is incorporated in the plug piece in a manner referenceable from the processing circuit on the columnar housing side via the socket, and further, the processing circuit on the columnar housing side of the multi-optical axis photoelectric sensor is set so as to determine a function based upon particular information in the plug piece referenced via the socket, wherein the particular information is one to serve as an element for determining a blanking function or a muting function.

2. The multi-optical axis photoelectric sensor and the plug piece according to claim 1, wherein a mode where particular information is referenceable from the processing circuit on the columnar housing side via the socket is formed by short-circuit between specific connection terminals connected to the socket in the plug piece in a manner corresponding to the classification of the particular information.

3. The multi-optical axis photoelectric sensor and the plug piece according to claim 1, wherein a function is incorporated in the processing circuit in the columnar housing, which is a function of controlling or stopping the operation of the processing circuit when detecting failure of attachment of the plug piece to the socket at application of power.

4. The multi-optical axis photoelectric sensor and the plug piece according to claim 1, wherein a function is incorporated in the processing circuit in the columnar housing, which is a function of regularly monitoring whether the plug piece is attached to the socket or not, and controlling or stopping the operation of the processing circuit after detecting failure of attachment of the socket to the plug piece.

5. The multi-optical axis photoelectric sensor and the plug piece according to claim 1, wherein the plug pieces are color-coded by function to be determined based upon the particular information.

6. A multi-optical axis photoelectric sensor and a plug piece to be used in combination with the multi-optical axis photoelectric sensor, wherein the multi-optical axis photoelectric sensor has a pair of columnar housings, an electric cord is pulled out from one end of at least one of the columnar housings in the longitudinal direction, while a plug-in type socket is provided at the other end thereof in the longitudinal direction, and an end plug of an electric cord pulled out from the columnar housing of another multi-optical axis photoelectric sensor is detachably attachable to the socket of the columnar housing, the columnar housing at least includes: a light projecting circuit for performing an operation of projecting light by means of light projecting element arrays as a series of light axis elements, or a light receiving circuit for performing an operation of receiving light by means of light receiving element arrays as a series of light axis elements, an input/output circuit for performing an operation of inputting from or outputting to the outside, and a processing circuit for controlling over those circuits to realize a function as a multi-optical axis photoelectric sensor, the plug piece is detachably attachable to the socket of the columnar housing, and particular information to serve as a function determining element on the columnar housing side is incorporated in the plug piece in a manner referenceable from the processing circuit on the columnar housing side via the socket, and further, the processing circuit on the columnar housing side of the multi-optical axis photoelectric sensor is set so as to determine a function based upon particular information in the plug piece referenced via the socket, wherein a mode where particular information is referenceable from the processing circuit on the columnar housing side via the socket is formed by incorporating a memory, in which data corresponding to the particular information is stored, in the plug piece, while delivering a pass, linked to a port for reading the data, to a particular connection terminal connected to the socket.

7. A multi-optical axis photoelectric sensor and a plug piece to be used in combination with the multi-optical axis photoelectric sensor, wherein the multi-optical axis photoelectric sensor has a pair of columnar housings, an electric cord is pulled out from one end of at least one of the columnar housings in the longitudinal direction, while a plug-in type socket is provided at the other end thereof in the longitudinal direction, and an end plug of an electric cord pulled out from the columnar housing of another multi-optical axis photoelectric sensor is detachably attachable to the socket of the columnar housing, the columnar housing at least includes: a light projecting circuit for performing an operation of projecting light by means of light projecting element arrays as a series of light axis elements, or a light receiving circuit for performing an operation of receiving light by means of light receiving element arrays as a series of light axis elements, an input/output circuit for performing an operation of inputting from or outputting to the outside, and a processing circuit for controlling over those circuits to realize a function as a multi-optical axis photoelectric sensor, the plug piece is detachably attachable to the socket of the columnar housing, and particular information to serve as a function determining element on the columnar housing side is incorporated in the plug piece in a manner referenceable from the processing circuit on the columnar housing side via the socket, and further, the processing circuit on the columnar housing side of the multi-optical axis photoelectric sensor is set so as to determine a function based upon particular information in the plug piece referenced via the socket, wherein a mode where particular information is referenceable from the processing circuit on the columnar housing side via the socket is formed by incorporating a memory in which data corresponding to the particular information is stored, a CPU and a communication circuit in the plug piece, while delivering a pass, linked to the communication circuit, to a particular connection terminal connected to the socket.

8. A multi-optical axis photoelectric sensor system, comprising:

a multi-optical axis photoelectric sensor for master, having a pair of columnar housings, from one end of at least one of which in the longitudinal direction an electric cord including an external input/output wire as a core wire is pulled out, and at the other end of at least one of which in the longitudinal direction a plug-in type socket is provided, one or more than one of multi-optical axis photoelectric sensors for coupling, having a pair of columnar housings, from one end of at least one of which in the longitudinal direction an electric cord including a signal wire between sensors as a core wire is pulled out, and at the other end of at least one of which in the longitudinal direction a plug-in type socket is provided, with a plug, detachably connectable to the socket of the multi-optical axis photoelectric sensor for master or another multi-optical axis photoelectric sensor, being attached to the end of the electric cord including the signal core wire between sensors, and a plug piece, detachably connectable to the socket of the multi-optical axis photoelectric sensor for master or the socket of the multi-optical axis photoelectric sensor for coupling, wherein the columnar housing of the multi-optical axis photoelectric sensor for master at least includes: a light projecting circuit for performing an operation of projecting light by means of light projecting element arrays as a series of light axis elements, or a light receiving circuit for performing an operation of receiving light by means of light receiving element arrays as a series of light axis elements, an input/output circuit for performing an operation of inputting from or outputting to the outside, and a processing circuit for controlling over those circuits to realize a function as a multioptical axis photoelectric sensor, the columnar housing of the multi-optical axis photoelectric sensor for coupling at least includes: a light projecting circuit for performing an operation of projecting light by means of light projecting element arrays as a series of light axis elements, or a light receiving circuit for performing an operation of receiving light by means of light receiving element arrays as a series of light axis elements, an input/output circuit for performing an operation of inputting from or outputting to the outside, and a processing circuit for controlling over those circuits to realize a function as a multi-optical axis photoelectric sensor, particular information to serve as a function determining element on the columnar housing side of the multi-optical axis photoelectric sensor for master or for coupling is incorporated in the plug piece in a manner referenceable from the processing circuit on the columnar housing side via the socket, a function is incorporated in the processing circuit in the columnar housing of the multi-optical axis photoelectric sensor for coupling, which is a function of transmitting particular information acquired from the plug piece attached via the socket or particular information from another adjacent multi-optical axis photoelectric sensor for coupling, to another multi-optical axis photoelectric sensor for coupling adjacent to the master side or the multi-optical axis photoelectric sensor for master, the processing circuit in the columnar housing of the multi-optical axis photoelectric sensor for master is set so as to determine a function based upon particular information in the plug piece referenced via the socket or particular information acquired from an adjacent multi-optical axis photoelectric sensor for coupling, and thereby, attachment of the plug piece to the socket of the columnar housing positioned at the most end of the series of mutually coupled columnar housings enables setting of a function of the multi-optical axis photoelectric sensor for master.

* * * * *